(12) United States Patent
Schank

(10) Patent No.: US 11,577,831 B2
(45) Date of Patent: Feb. 14, 2023

(54) HIGH SPEED ROTORCRAFT PROPULSION CONFIGURATION

(71) Applicant: Textron Innovations Inc., Providence, RI (US)

(72) Inventor: Troy C. Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/449,916

(22) Filed: Oct. 4, 2021

(65) Prior Publication Data

US 2022/0024574 A1 Jan. 27, 2022

Related U.S. Application Data

(62) Division of application No. 16/143,240, filed on Sep. 26, 2018, now Pat. No. 11,167,845.

(Continued)

(51) Int. Cl.
*B64C 29/00* (2006.01)
*B64D 35/04* (2006.01)
(Continued)

(52) U.S. Cl.
CPC .......... *B64C 29/0033* (2013.01); *B64C 11/28* (2013.01); *B64C 27/14* (2013.01); *B64D 35/02* (2013.01); *B64D 35/04* (2013.01); *F02C 6/206* (2013.01); *F02C 7/04* (2013.01); *F02C 7/36* (2013.01); *F05D 2220/323* (2013.01); *F05D 2220/329* (2013.01); *F05D 2240/12* (2013.01); *F05D 2260/40* (2013.01)

(58) Field of Classification Search
CPC ............................ B64C 29/0033; B64D 35/04
See application file for complete search history.

(56) References Cited

U.S. PATENT DOCUMENTS

| 4,828,203 A | 5/1989 | Clifton et al. | |
|---|---|---|---|
| 2005/0151001 A1* | 7/2005 | Loper | B64C 27/26 244/6 |

(Continued)

FOREIGN PATENT DOCUMENTS

| CN | 2168751 | 6/1994 |
|---|---|---|
| WO | 2009149592 A1 | 12/2009 |

OTHER PUBLICATIONS

EP 18205510 Search Report, dated Apr. 16, 2018, 1 page.

*Primary Examiner* — Timothy D Collins
*Assistant Examiner* — Terri L Filosi
(74) *Attorney, Agent, or Firm* — Whitaker Chalk Swindle & Schwartz PLLC; Enrique Sanchez, Jr.

(57) ABSTRACT

A tiltrotor aircraft having a propulsion configuration that divorces the engine core power from the thrust fan, using a combined gearbox with a plurality of clutches to couple and decouple one or more rotor systems and one or more thrust fans. The aircraft can be operable for vertical takeoff and landing (VTOL) in a helicopter mode, forward flight in a proprotor mode, and high-speed forward flight in an airplane (jet) mode. The propulsion configuration provides shaft horsepower (SHP) to rotors for VTOL flight, while also providing SHP to the thrust fan for high speed flight. Allowing the rotor and the thrust fan to be clutched on and off, sequentially, enables transition from rotor-borne VTOL flight to wing-borne thrust fan flight, and back.

11 Claims, 12 Drawing Sheets

Related U.S. Application Data

(60) Provisional application No. 62/723,363, filed on Aug. 27, 2018.

(51) Int. Cl.
*F02C 7/36* (2006.01)
*B64C 11/28* (2006.01)
*B64C 27/14* (2006.01)
*B64D 35/02* (2006.01)
*F02C 6/20* (2006.01)
*F02C 7/04* (2006.01)

(56) References Cited

U.S. PATENT DOCUMENTS

| | | |
|---|---|---|
| 2012/0292456 A1 | 11/2012 | Hollimon et al. |
| 2016/0152329 A1 | 6/2016 | Tzeng et al. |
| 2016/0229531 A1 | 8/2016 | Robertson et al. |
| 2017/0144746 A1 | 5/2017 | Schank et al. |
| 2017/0297694 A1 | 10/2017 | Luszcz et al. |

\* cited by examiner

HIGH SPEED ROTORCRAFT PROPULSION CONFIGURATION

CROSS REFERENCE TO RELATED APPLICATIONS

This Application is a Divisional Application of U.S. application Ser. No. 16/143,240, filed Sep. 26, 2018, which claims the benefit of U.S. Provisional Application Ser. No. 62/723,363, filed Aug. 27, 2018, the entireties of which are herein incorporated by reference for all purposes.

BACKGROUND

Field of the Invention

The present invention is generally related to propulsion systems, and more specifically to systems and methods for mapping bond lines between composite components to detect and reduce voids.

Background of the Invention

Tiltrotor aircraft utilize proprotors to change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing, such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of tiltrotor aircraft in forward flight.

Convertible engines offer the possibility to provide both thrust and mechanical shaft power in tiltrotor aircraft configurations and in conventional aircraft configurations that require mechanical shaft power in cruise conditions to power generators, charge weapons systems, or the like. These convertible engines are operable as a turbofan engine to produce thrust and a turboshaft engine to produce mechanical shaft power when thrust is not required. Such convertible engines utilize a bypass fan positioned in front of the engine core and rigidly connected to a power output shaft. During operation as a turbofan engine, the bypass fan produces a bypass airflow to provide thrust to the aircraft. During operation as a turboshaft engine, the bypass airflow produced by the bypass fan is blocked, allowing other aircraft systems to utilize the power produced by the convertible engine via the power output shaft. However, the bypass fan always rotates with operation of the convertible engine, even when bypass airflow used to produce thrust is not required. This results in significant parasitic power loss caused by the drag of the rotating bypass fan. Additional power or performance losses may also result from the increased size of filtration system components and increased pressure drop through such filtration components. Further, bypass airflow increases residual thrust levels which must be compensated for by other aircraft systems (e.g., main rotor) which further drives additional power or performance losses.

Other approaches have combined the thrust fan and the engine into a single unit. Such a configuration results in a heavy aft due to component placement. Attempts to limit the thrust fan via inlet guide vanes (IGVs), produce unwanted thrust and rob the engine of available power, resulting in degraded aircraft performance in shaft mode. Large air inflow into the engine and thrust fan limit filtration options, thereby shortening engine life. A combined engine and thrust fan add complexity to already complicated control mechanisms by transitioning power between the rotor and the thrust fan.

A major challenge with aircraft configurations that include the engine core and the thrust fan in a single package is that the configuration includes a custom-designed engine, with no off-the-shelf or commercially available solutions. As such, every time an aircraft is designed, the engine must be specifically designed for that aircraft—adding to the complexity and expense. Another challenge with this configuration arises from the thrust fan's connection to the power output shaft, which is always turning. So when the air is choked-off, most of the power transfers to the rotors in helicopter mode. However, the airflow to the thrust fan cannot be completely choked-off, because some air must continue to flow to keep the thrust fan blades rotating to maintain aero-mechanical stability. Choking-off the airflow through the thrust fan completely would result in fan instability, potentially resulting in breakage or other undesired event. However, this continuous airflow to the thrust fan comes at the following costs: (1) approximately 20% of the total power capability of the engine is lost, and (2) a certain amount of residual thrust is produced from the aft of the aircraft.

To counteract the residual bypass fan thrust, the rotors must be tilted back, resulting in additional helicopter mode problems at high altitudes and particularly hot climates. Further, by counteracting the residual thrust, lift capability is reduced. Also, when landing in helicopter mode in unprepared areas, the constantly moving air from the thrust fan stirs up dust and debris that can enter the engine, thereby limiting the life of the engine. Although filters have been developed to protect the engine core, when the fan and the core are a single package, the area to be covered is impracticably large thereby eliminating the ability to filter the air.

SUMMARY

The present disclosure describes the technical advantages of a tiltrotor aircraft having a propulsion configuration that selectively divorces the engine core power from a thrust fan and a rotor system, using a combined gearbox with a plurality of clutches to couple and decouple one or more rotor systems and one or more fans. The aircraft can be operable for vertical takeoff and landing (VTOL) in a helicopter mode, forward flight in a proprotor mode, and high-speed forward flight in an airplane (jet) mode. The tiltrotor aircraft can transition between rotary and non-rotary flight modes, using the propulsion configuration, which can reduce power losses and other parasitic effects by coupling and decoupling rotors and thrust fans.

When a thrust fan and an engine core are coupled into a single unit, the fan and the core must rotate at the same speed, as they are mechanically coupled. However, the two components steady state pulls in opposite directions, since the thrust fan is more efficient at a lower rotational speed than the engine core, and the engine core is more efficient at a higher rotational speed than the thrust fan. Advantageously, a combined gearbox separates the engine core from the thrust fan to allow the engine core and the thrust fan to run at their optimal rotational speeds, by implementing a plurality of clutches to isolate each component so that they are not running at a compromise. Separation of the thrust fan from the engine core results in aerodynamic efficiencies such as residual thrust, reclamation of power loss, and protection of the inlet. Conversion of an existing gearbox into a combining gearbox minimizes the weight impact on the aircraft. Divorcing the engine core from the thrust fan provides flexibility in component location on the aircraft and flexibility in inlet sizing to allow for protection from dust and debris. Finally, the propulsion configuration allows the further flexibly to use commercially available turboshaft engine cores, greatly reducing costs.

By adding a fan clutch, the thrust fan can mechanically decouple from the shaft while in helicopter mode. The thrust fan can come to a complete stop since there is no longer any residual thrust to be overcome. Additionally, since the thrust fan is isolated, there is no longer a 20% power reduction, resulting in 20% more power that can be provided to the rotors. A fan clutch can intelligently turn the thrust fan on and off, such as when there is minimal torque. Since the fan is divorced from the engine, the aircraft can be more easily balanced as there is flexibility of component positioning. A gearbox takes power from the engines and provides the power to the rotor system and the thrust fan. The propulsion configuration provides shaft horsepower (SHP) to rotors for VTOL flight, while also providing SHP to the thrust fan for high speed, turbofan flight. Allowing the rotor and the thrust fan to be clutched on and off, sequentially, enables transition from rotor-borne VTOL flight to wing-borne thrust fan flight, and back.

The propulsion configuration enables rotor-born, VTOL flight at high speeds (>450 kts). All system components are disposed external to the primary structure, thereby enabling maintenance access. Aircraft engine(s) are disposed fore of a combining gear box (CGB) and operatively coupled thereto. A thrust fan can be disposed aft of the CGB and operatively coupled thereto. The engine(s) can provide inputs to the CGB and the thrust fan can receive outputs from the CGB. The CGB can include a plurality of clutches for selectively engaging aircraft rotors and the thrust fan.

One exemplary embodiment of the disclosure includes a tiltrotor aircraft having an engine core; a thrust fan; a rotor system; a combined gearbox operably coupled to the engine core and the thrust fan, the combined gearbox having a rotor clutch configured to selectively couple the rotor system to the engine core and a fan clutch configured to selectively couple the thrust fan to the engine core. Another exemplary embodiment of the disclosure includes a rotor clutch including a friction clutch and a lockshaft spline; and a fan clutch including a friction clutch and a lockshaft spline.

Yet another exemplary embodiment of the disclosure includes a method for transitioning an aircraft from proprotor mode to airplane mode. The method can provide power from an engine core to a rotor system via a rotor clutch operably coupled to the engine core and the rotor system to allow an aircraft vertical take-off and landing; open an inlet guide vane to direct airflow to a thrust fan; increase the thrust fan's rotation speed to substantially the same rotation speed of an engine cores; couple the engine core and the rotor system by selectively engaging a fan clutch when the thrust fan's rotation speed effectively matches the engine core's rotation speed; retract the rotor blades into a stowed mode substantially parallel to a rotor system nacelle; and de-clutching the rotor system to transfer full power to the thrust fan.

Other advantages will be apparent to those of ordinary skill in the art.

DETAILED DESCRIPTION

The preferred versions of the inventions are presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the inventions as described herein. The examples used in the description which follows are intended merely to facilitate an understanding of ways in which the inventions may be practiced and to further enable those skilled in the art to practice the inventions. Accordingly, the examples should not be construed as limiting the scope of the claimed inventions.

Figure 1:
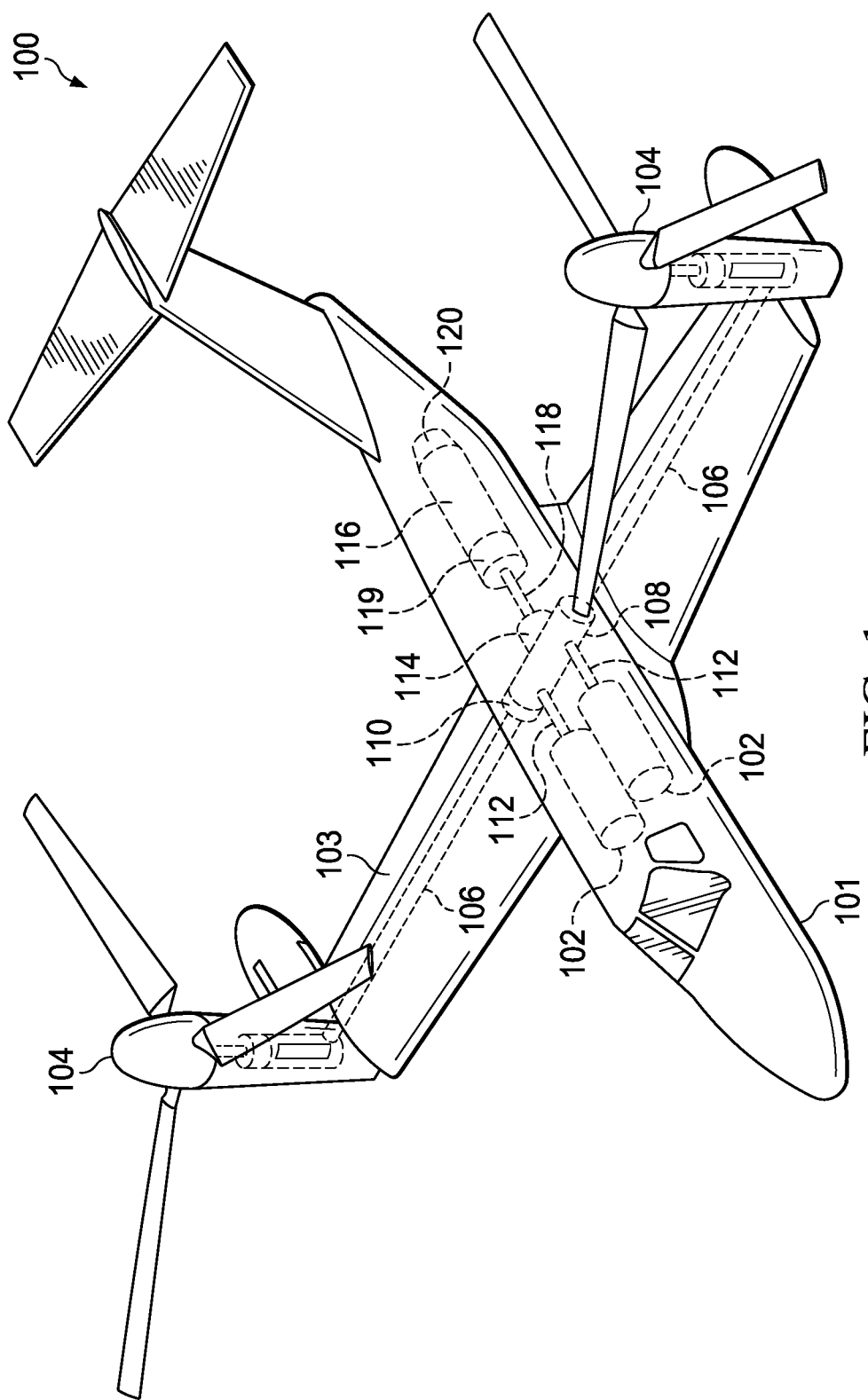
FIG. 1 is a schematic, perspective view of an aircraft in a helicopter mode, having a propulsion configuration in accordance with embodiments of the present disclosure.
Figure 2:
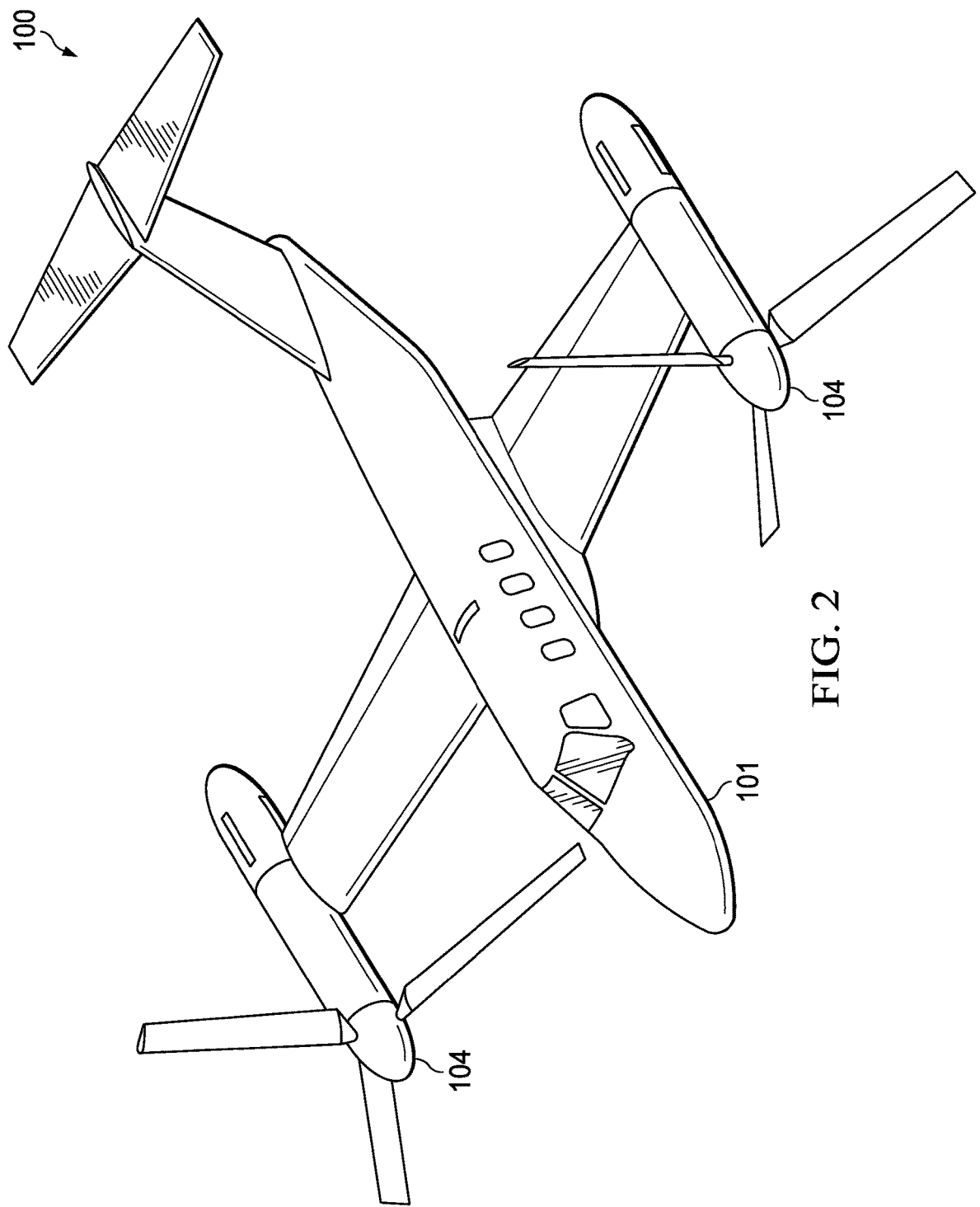
FIG. 2 is a perspective view of an aircraft in a proprotor mode, in accordance with an embodiment of the present disclosure.
Figure 3:
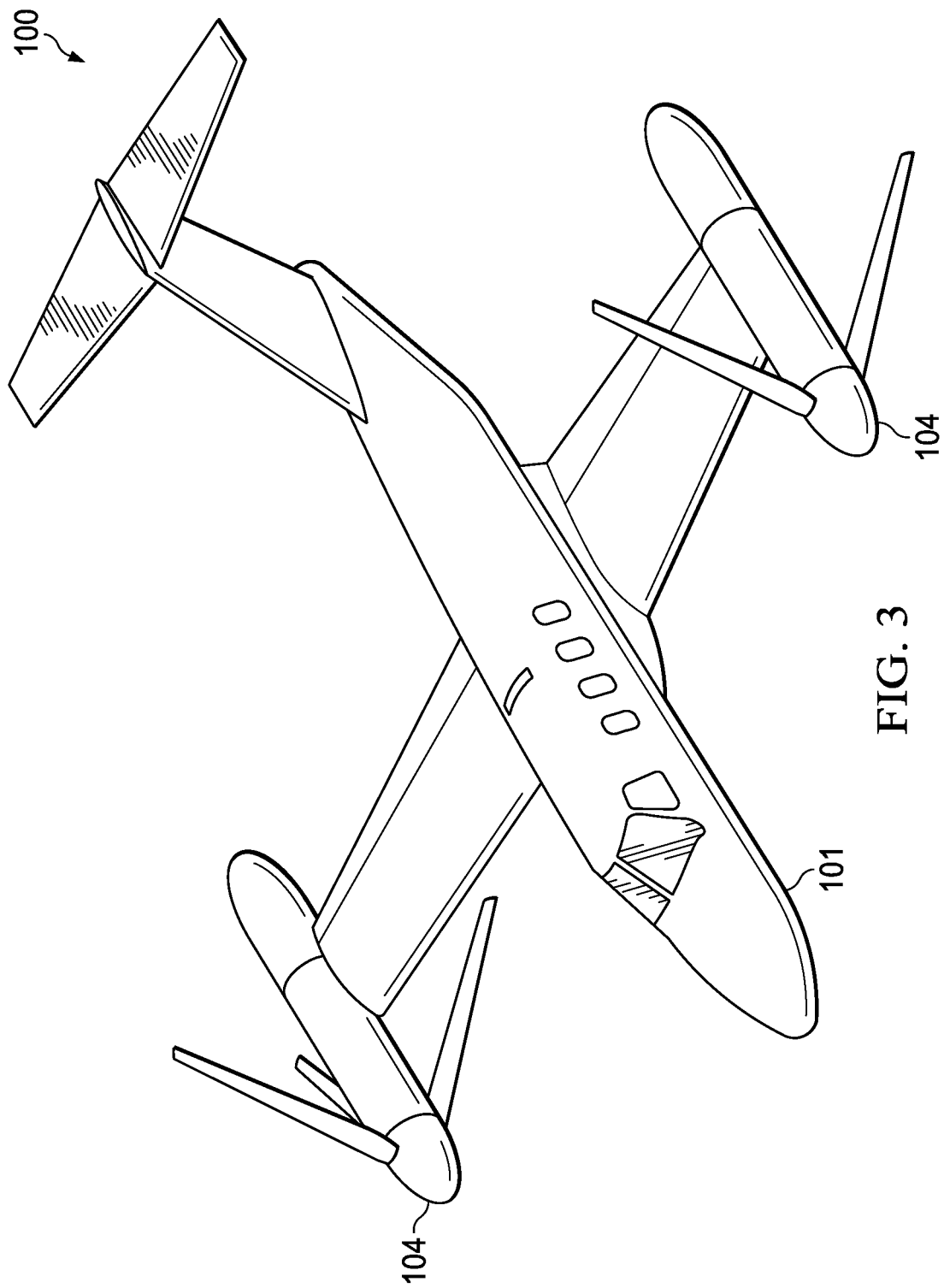
FIG. 3 is a perspective view of an aircraft in an airplane mode, transitioning its rotor blades into a stowed-rotor mode, in accordance with an embodiment of the present disclosure.
Figure 4:
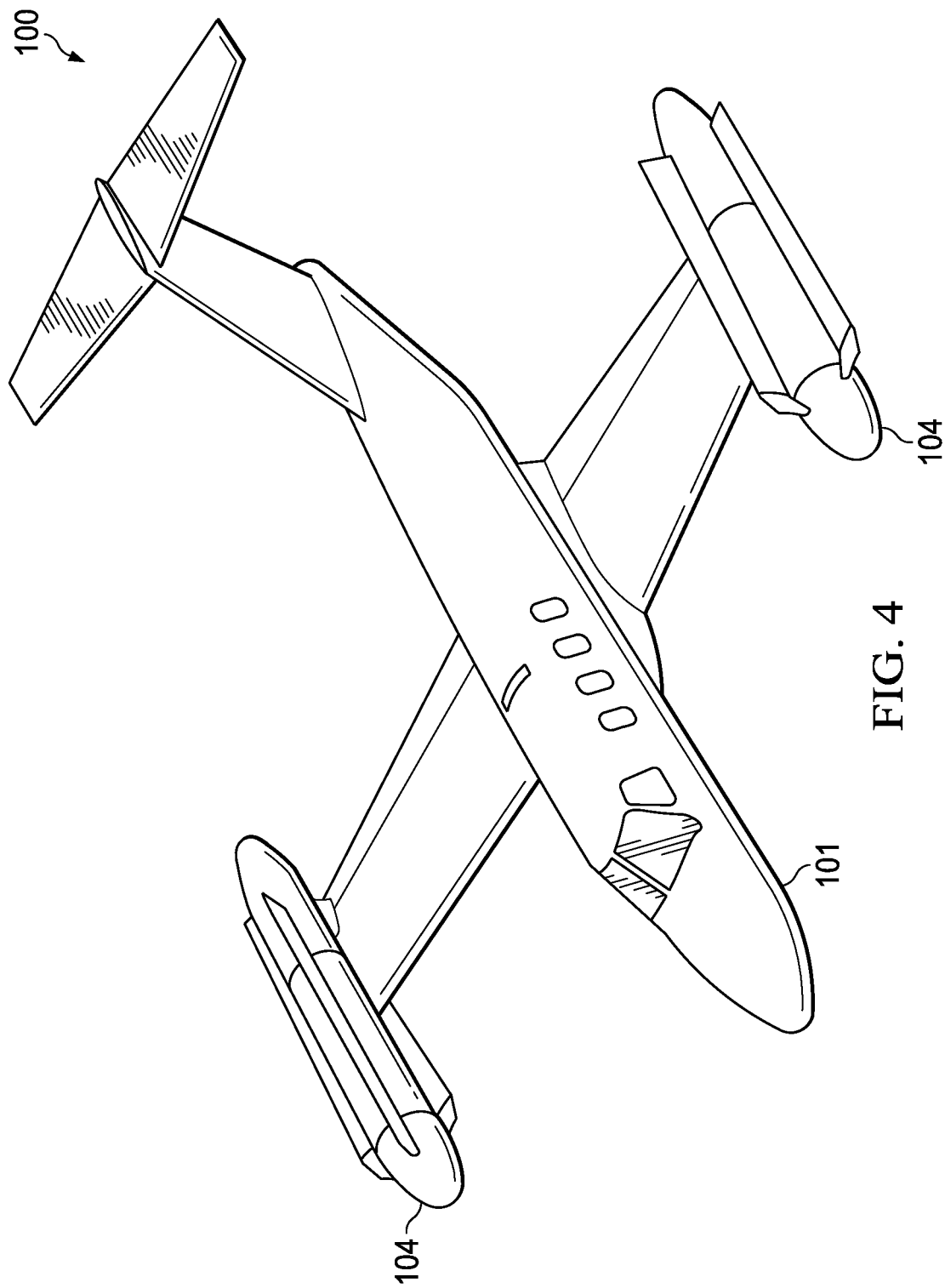
FIG. 4 is a perspective view of an aircraft in an airplane mode, having rotor blades in a stowed-rotor mode, in accordance with an embodiment of the present disclosure.

FIG. 1 is a schematic, perspective view of an aircraft 100, in a helicopter mode, having a propulsion configuration in accordance with embodiments of the present disclosure. The aircraft 100 can be a tiltrotor aircraft operable in a helicopter mode for vertical flight. The aircraft 100 includes a fuselage 101, a wing 103. Located proximate the outboard ends of wing 103 are rotor systems 104 that are rotatable, relative to the wing 103, between a generally vertical orientation, as seen in FIG. 1, and a generally horizontal orientation, as seen in FIGS. 2, 3, and 4. The rotor systems 104 can include rotor blades, pylons, rotor assemblies, nacelles, rotor gearboxes, and portions of the drive system that is used to rotate the pylons.

The aircraft 100 can include one or more engines 102, a combined gearbox (CGB) 108, and a thrust fan 116. The CGB 108 preferably includes a rotor clutch 110 and a fan clutch 114. The thrust fan 116 is operably connected to an inlet guide vane (IGV) 119 on a first end and a variable area nozzle (VAN) 120 on a second end. The engines 102 are operatively coupled to the CGB 108 via engine drive shafts 112. The rotor systems 104 are operatively coupled to CGB 108 via rotor drive shafts 106. The thrust fan 116 is operatively coupled to the CGB 108 via a fan drive shaft 118.

As discussed in more detail below the aircraft 100 can convert from a helicopter mode for VTOL to an airplane mode for forward flight. Additionally, the aircraft 100 can transition from a proprotor to an airplane (jet) by folding the rotors into a stowed mode to effectively eliminate the aerodynamic issues associated with the rotor blades. Such an aircraft requires a special propulsion system that can provide full shaft torque to the rotors while in full helicopter mode and operate like a jet in airplane mode. For any sort of efficient high speed flight, a thrust producing (bypass) fan is preferable.

A convertible engine is a type of propulsion engine that can convert between using shaft horsepower output and thrust output by incorporating an engine core 102 and a thrust fan 116. In one exemplary embodiment, the convertible engine preferably includes two engine cores 102 disposed fore of a combined gearbox 108, which is fore of a thrust fan 116. However, other exemplary embodiments can include any suitable number of engine cores 102 and thrust fans 116 in any suitable location on the aircraft 100. Typically in a jet, you have an engine core 102 and a thrust fan 116 that produces thrust. In a helicopter, thrust is typically generated by rotor system that is operatively connected to a turbo shaft. In order to incorporate both aspects of a jet and a helicopter, the convertible engine weight must be balanced and the engine power directed to either the thrust fan 116 or the rotor systems 104.

The thrust fan 116 leverages IGV 119 to control the airflow into the thrust fan 119. When IGV 119 chokes-off the airflow to the thrust fan 116, instead of the fan absorbing the power produced by the engine cores 102, the rotor drive shaft 106 can absorb the power and the shaft is operably coupled to the rotor systems 104 to drive the rotor systems 104. When transitioning to airplane mode, the power generated by the engines 102 is preferably transferred to the thrust fan 116. The rotors can be stopped, and the IGV 119 opened, such that the thrust fan 116 can produce the thrust again. The engine core 102 and the thrust fan 116 are mechanically coupled via the CGB 108.

Each engine core 102 is operably coupled to an engine drive shaft 112, which is operably coupled to the CGB 108. The CGB 108 can transfer the power from the engines to either the rotors system 104 (via rotor drive shafts 106) or the thrust fan 116 (via fan drive shaft 118). The gearbox includes a rotor clutch 110, which can selectively engage and disengage the rotor systems 104. The rotor clutch 110 can include a friction clutch that provides a course rotational speed matching of the engine core 102 with the rotor system 104. A spline can then be utilized to match and maintain the rotational speed of the engine core 102 with the rotor system 104.

During VTOL, the aircraft 100 is in helicopter mode. The engine cores 102 transfer their power to the CGB 108 via engine drive shafts 112. The CGB 108 engages the rotor drive shaft 106, which is operably coupled to the CGB 108 via the rotor clutch 110, and transfers the power from the engine core 102 to the rotor systems 104. The aircraft 100 can then take-off, hover, and land in helicopter mode. While in helicopter mode, the rotor clutch 110 is engaged to drive the rotor system 104. Advantageously, the fan clutch 114 is dis-engaged, with the IGV 119 closed, while the aircraft 100 is in helicopter mode, such that there is no power transferred to the thrust fan 116. By disengaging the thrust fan 116, all of the power generated by the engine cores 102 can be transferred to the rotor systems 104, thereby eliminating the traditional 20% power loss associated with conventional convertible engines. Further, as the thrust fan is de-clutched from the system, it is free to rotate at its natural (slower) rotational speed to maintain aeroelastic stability.

FIG. 2 is a perspective view of an aircraft 100, in a proprotor mode, in accordance with an embodiment of the present disclosure. The aircraft 100 can be a tiltrotor aircraft operable in a proprotor mode for forward flight via utilization of the rotor systems 104. With the rotor systems 104 rotated in a generally horizontal position, the aircraft 100 effectively operates as a propellered airplane.

During forward flight in proprotor mode, the engine cores 102 transfer their power to the CGB 108 via engine drive shafts 112. The CGB 108 engages the rotor drive shaft 106, which is operably coupled to the CGB 108 via the rotor clutch 110, and transfers the power from the engine core 102 to the rotor systems 104. The aircraft 100 can then utilize the forward thrust generated by the rotor systems 104 rotated into a horizontal position, coupled with the lift provided by the wing 103 for forward flight in proprotor mode. While in proprotor mode, the rotor clutch 110 is engaged to drive the rotor system 104. Advantageously, the fan clutch 114 is dis-engaged, with the IGV 119 closed, while the aircraft 100 is in proprotor mode, such that there is no power transferred to the thrust fan 116. By disengaging the thrust fan 116, all of the power generated by the engine cores 102 can be transferred to the rotor systems 104, thereby eliminating the traditional 20% power loss associated with conventional conversion engines. Further, as the thrust fan is de-clutched from the system, it is free to rotate at its natural (slower) rotational speed to maintain aeroelastic stability.

When the rotor systems 104 are rotated vertically, the aircraft 100 can take-off and hover like a helicopter and as the nacelles are rotated horizontally, the aircraft 100 can accelerate in forward flight. Conversion occurs when the nacelles are tilted forward such that the aircraft 100 "converts" from essentially a helicopter into essentially a proprotor. The conversion period preferably begins when the nacelles tilt from 90° to 0° and the rotor is pointing into the air axially and you have axial flow through the rotor system 104. However, any suitable nacelle tilt angle can be utilized as the conversion period.

FIG. 3 is a perspective view of an aircraft 100, in airplane mode, transitioning its rotor blades into a stowed-rotor mode, in accordance with an embodiment of the present disclosure. The aircraft 100 can be a tiltrotor aircraft operable in an airplane mode, with mechanisms for folding the rotor blades of the rotor system 104 for reduction of drag during forward flight. To minimize the forces acting on the rotor blades, the rotor blades can be feathered prior to retraction into a stowed position parallel to its respective pylon.

The transition process enables the propulsion configuration of aircraft 100. The transition process includes transferring the thrust from the rotor system 104 to the thrust fan 116. During flight, the thrust from the rotor system 104 can be transferred to the thrust fan 116 during a transition process. During the transition process, the power from the main rotors is slowly decreased and the fan clutch 114 is engaged such that the power from the engine cores 102 can be transferred to the thrust fan 116, so that steady, level flight is maintained. Ideally, transition occurs at a steady, level condition so the transition is smooth without impressing large moments or forces on the aircraft 100 during flight.

FIG. 4 is a perspective view of an aircraft in an airplane mode, having rotor blades folded in a stowed-rotor mode, in accordance with an embodiment of the present disclosure. The rotor blades can be folded substantially parallel to respective pylon assemblies to minimize the drag force generated by the blades during forward flight. The forward cruising speed of the aircraft 100 can be significantly higher in forward flight with the rotor blades folded, as the forward airspeed induced aeroelastic instability is effectively neutralized. The rotor blade rotation is stopped and the rotor blades are folded to enable the aircraft to have aerodynamic properties similar to a jet.

When the rotor systems 104 are mechanically de-clutched via the rotor clutch 110, the rotors are disengaged such that none of the engine power is transferred to the rotor systems 104. The CGB 108 can then engage the fan clutch 114 to transfer the power from the engine core 102 to the thrust fan 116. The IGV 119 is opened and the thrust fan 116 starts to absorb power from the engine core 102. All the power is thereby transferred to the thrust fan 116 to produce thrust, and the aircraft 100 increases speed quickly.

Figure 5:
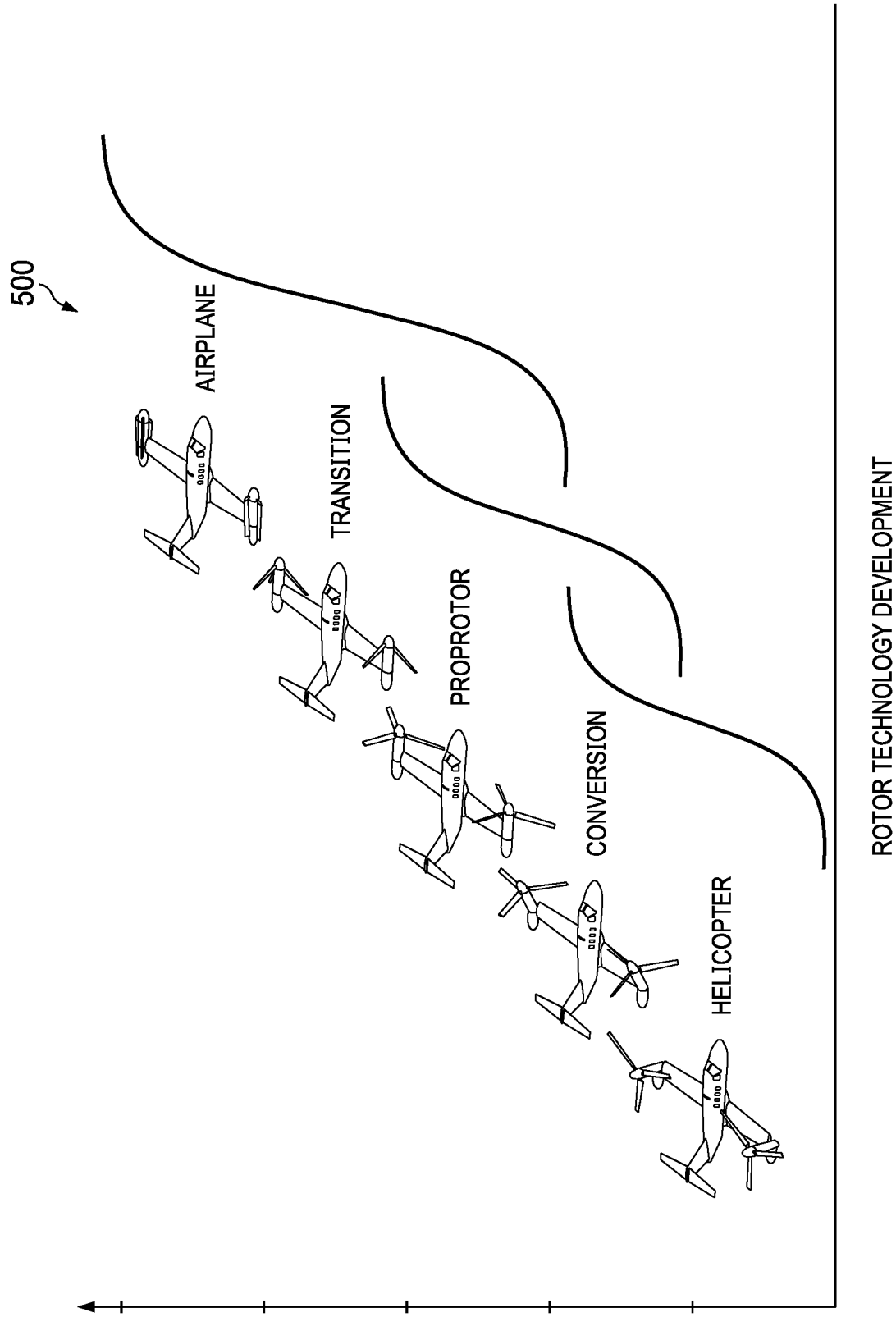
FIG. 5 is a schematic view of the flight mode progression to stowed rotor mode, in accordance with the present disclosure.

FIG. 5 is a schematic view of the flight mode progression to stowed rotor mode, in accordance with the present disclosure. The flight mode progression chart 500, shows the rotor technology development stages and how each stage represents an increase in aircraft airspeed.

Figure 6:
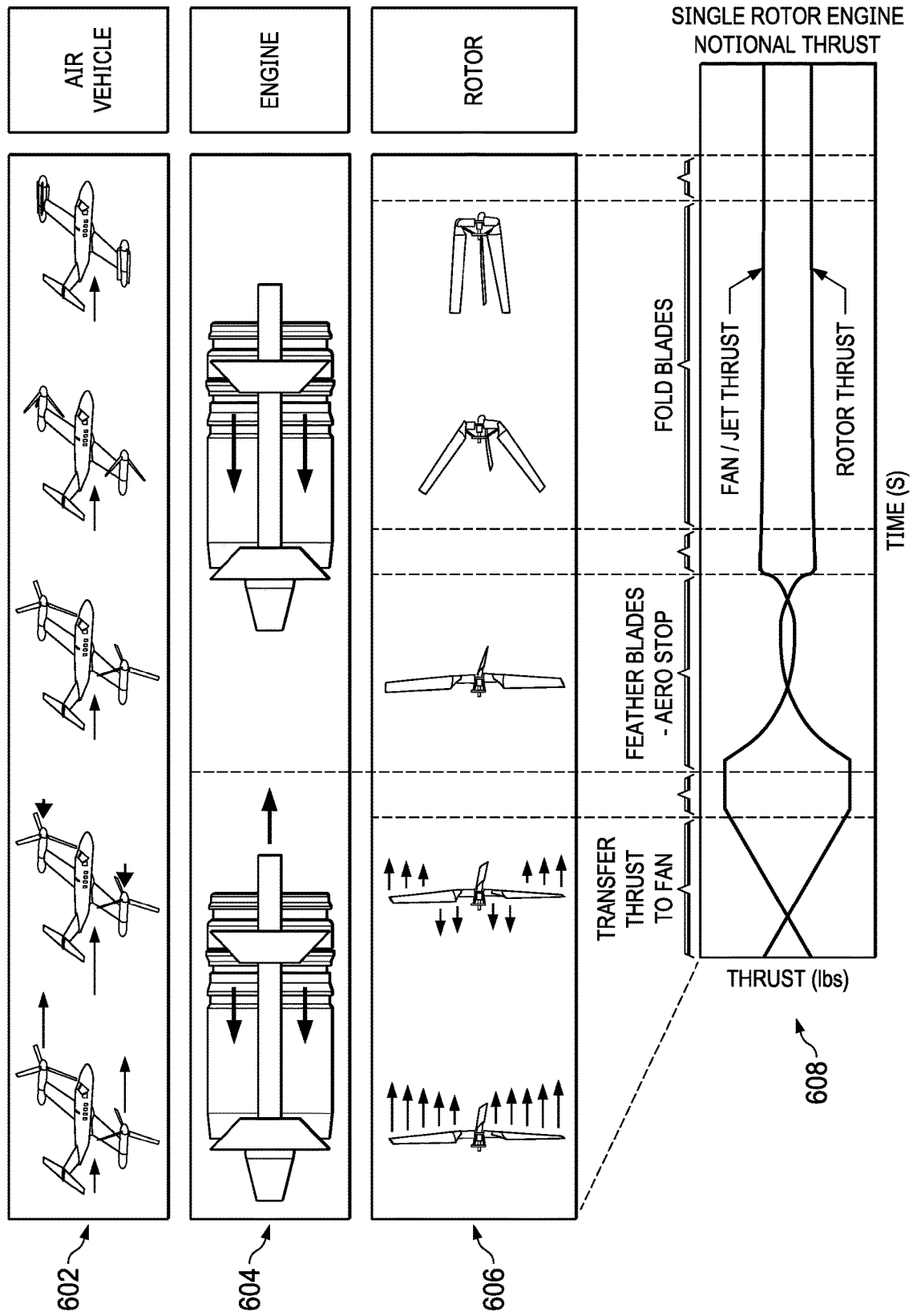
FIG. 6 is a schematic view of an outbound transition timeline during steady level flight, in accordance with the present disclosure.

FIG. 6 is a schematic view of an outbound transition timeline during steady level flight, in accordance with the present disclosure. The outbound transition timeline shows the following graphics along a common timeline to disclose the temporal relationship between the aircraft 100, the engine core 102, the rotor system 104, and the associated thrust magnitudes.

An air vehicle graphic 602 shows the outbound aircraft 100 transition (from proprotor mode to airplane mode) and accompanying rotor system 104 thrust vectors (in blue) and fan 116 thrust vectors (in red). During outbound transition, the primary thrust generation transitions from the rotors 104 to the fan 116. While in airplane mode, the thrust is only generated by the fan 116.

An engine thrust graphic 604 shows the thrust vectors for the fan 116 and the rotor system 104. Initially, a majority of the thrust originates from the rotor 104, as the aircraft 100 is in proprotor mode. As the aircraft transitions into airplane mode, a majority of the thrust is transferred to the thrust fan 116, as the aircraft 100 is in airplane mode.

A rotor position graphic 606 shows the transition of the rotor blades from operation to a stowed mode. Initially, the rotor blades produce all forward thrust, as shown via the blue vector arrows. However, as rotor thrust is reduced to zero via disengagement of the rotor clutch, the rotor blades begin to windmill from the airflow. The gimbal of the rotor system 104 is locked to stop the rotor flapping, the blades are feathered to stop rotor rotation, and the rotor folding mechanism is unlocked to allow the rotor blades to fold substantially parallel to the pylon of the rotor system 104. The rotor blades are locked in a stowed mode to end the transition process.

A thrust vs. time diagram 608 shows the thrust transfer between the thrust from the thrust fan 116 (red) and the thrust from the rotor system 104 (blue). As the thrust is transferred from the rotor system 104 to the thrust fan 116, the rotor thrust actually becomes drag as the rotor blades windmill. As the rotor blades are feathered to turn the edge parallel to the airflow, the drag turns into minimal thrust. As the rotor blades transition into a stowed mode, the thrust drops to effectively zero.

In helicopter mode, the fan 116 is completely de-clutched from the fan clutch 114. So, as forward flight begins, the IGV 119 is still closed to prevent the fan 116 from spinning (windmiling) to an extent that it creates drag. Once a sufficient airspeed is attained, such that it is possible to pass the thrust from the rotor systems 104 to the thrust fan 116, the IGV 119 is opened in front of the thrust fan 116. The rotor systems 104, change the thrust by collectively changing the pitch on all the rotor blades via a swash plate, thereby mechanically changing the rotor blade angle of attack. Typically on thrust fans 116, the angle of attack is fixed as they spin a lot faster, are placed together, and packaged more closely. Thrust fans 116 modulate thrust via IGVs 119 that block and open the airflow. Thrust fans can utilize a variable area nozzle (VAN) 120 to control the exit pressure to modulate the thrust.

Figure 7:
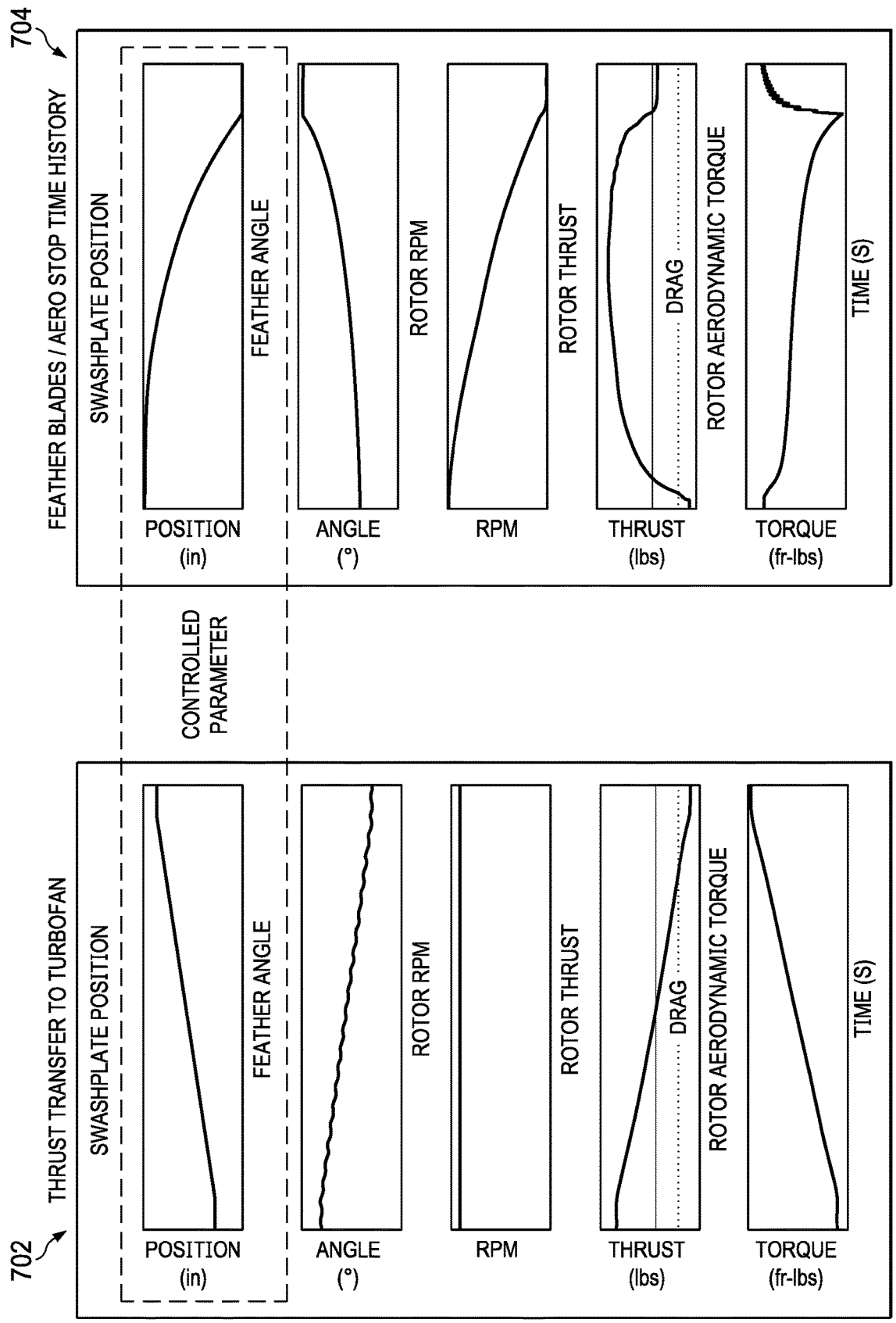
FIG. 7 is a schematic view of various outbound transition rotor control graphs, in accordance with the present disclosure.

FIG. 7 is a schematic view of various outbound transition rotor control graphs, in accordance with the present disclosure. Column 702 shows the metrics associated with thrust transfer to the thrust fan. The swashplate position increases as the feather angle decreases, and the rotor RPM is effectively steady. However, the rotor thrust decreases and the absolute value of rotor aerodynamic torque decreases. Column 704 shows the metrics associated with transition process associated with blade feathering. The swashplate position decreases as the feather angle increases, and the rotor RPM drops to a zero value. However, the rotor thrust increases from drag for a period before settling out at zero, and the rotor aerodynamic torque decreases to zero, before jumping up to a positive torque value.

Figure 8:
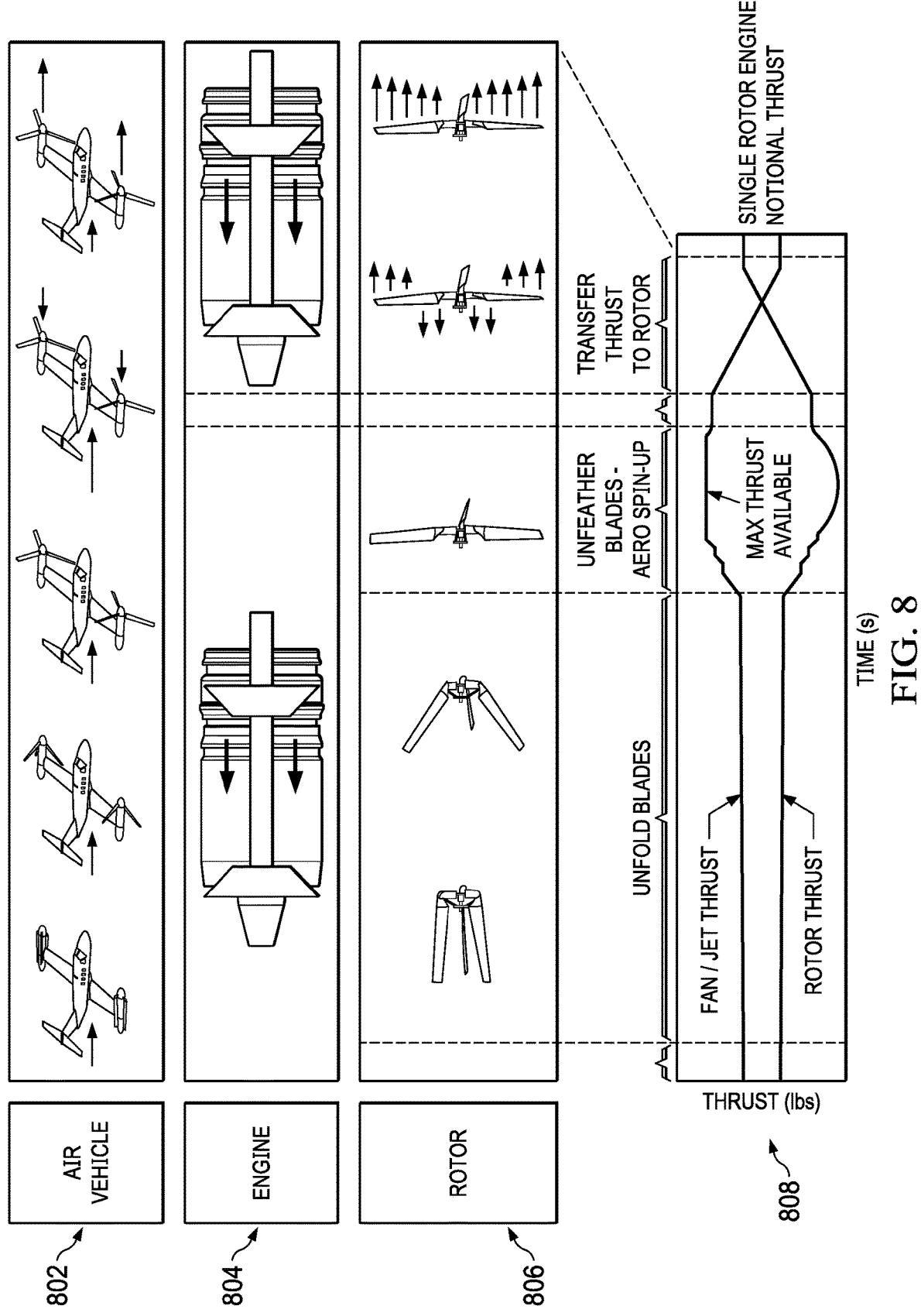
FIG. 8 is a schematic view of an inbound transition timeline during steady level flight, in accordance with the present disclosure.

FIG. 8 is a schematic view of an inbound transition timeline during steady level flight, in accordance with the present disclosure. The inbound transition timeline shows the following graphics along a common timeline to disclose the temporal relationship between the aircraft 100, the engine core 102, the rotor system 104, and the associated thrust magnitudes.

An air vehicle graphic 802 shows the inbound aircraft 100 transition (from airplane mode to proprotor mode) and accompanying rotor system 104 thrust vectors (in blue) and fan 116 thrust vectors (in red). During inbound transition, the primary thrust generation transitions from the fan 116 to the rotors 104. While in airplane mode, the thrust is only generated by the fan 116.

An engine thrust graphic 804 shows the thrust vectors for the fan 116 and the rotor system 104, effectively working in reverse from the outbound transition process disclosed in FIG. 6. Initially, a majority of the thrust originates from the thrust fan 116, as the aircraft 100 is in airplane mode. As the aircraft transitions back into proprotor mode, the thrust fan thrust decreases until a majority of the thrust originates from the rotor system 104, in proprotor mode.

A rotor position graphic 806 shows the transition of the rotor blades from a stowed mode into operation. As the rotor blades unfold, they deploy in the feathered state and produce a small drag increase. As the blades unfeather, the rotor spins up to match the rotation speed of the engine and drag substantially increases.

A thrust vs. time diagram 808 shows the thrust transfer between the thrust from the thrust fan 116 (red) and the thrust from the rotor system 104 (blue). As the thrust is transferred from the thrust fan 116 to the rotor system 104, the fan thrust experiences a boost as the blades are unfeathered and spin up. Once the rotor clutch is engaged, after the engine and rotor RPMS equalize, the fan thrust decreases as the fan clutch is disengaged.

Figure 9:
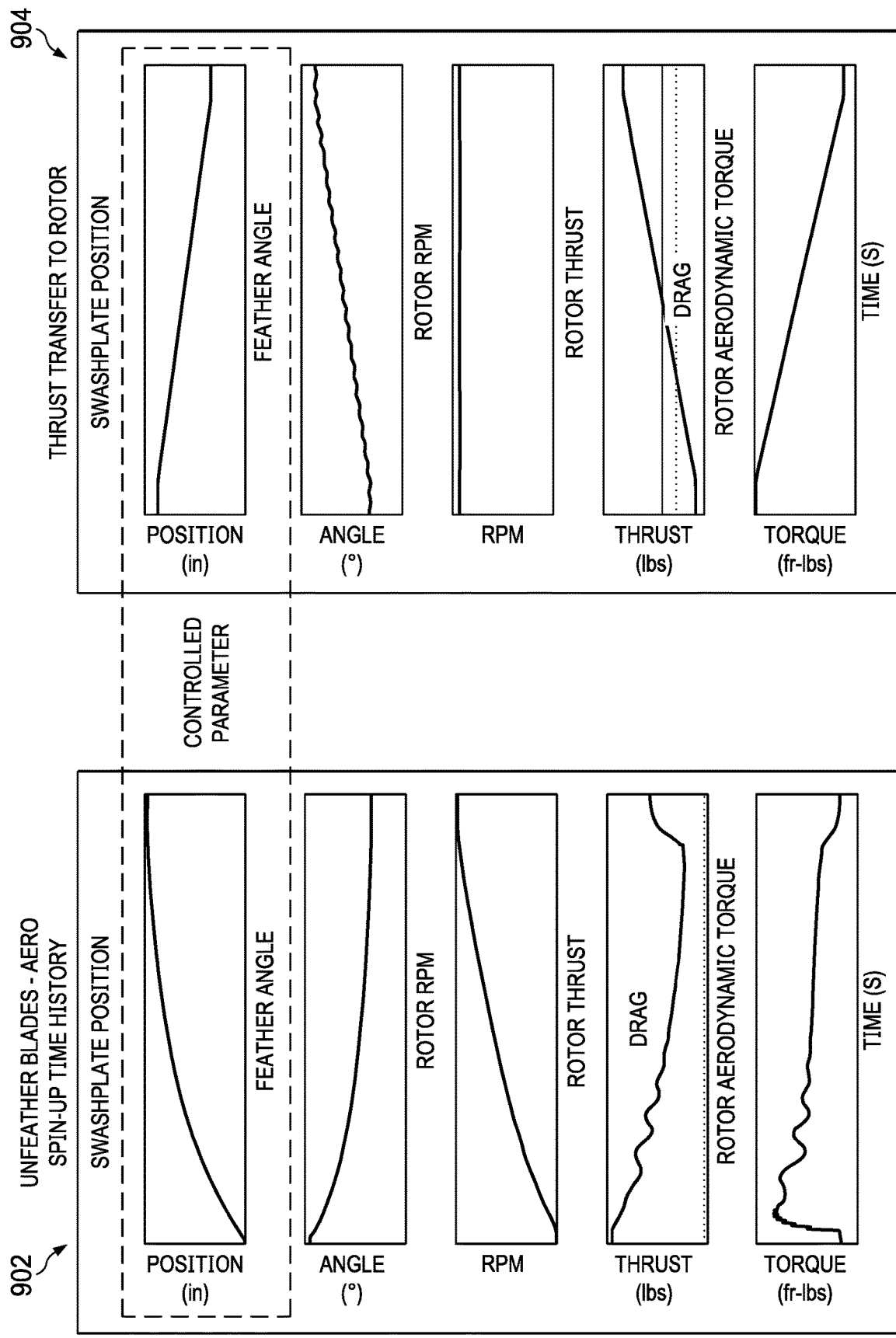
FIG. 9 is a schematic view of various inbound transition rotor control graphs, in accordance with the present disclosure.

FIG. 9 is a schematic view of various inbound transition rotor control graphs, in accordance with the present disclosure. Column 902 shows the metrics associated with the inbound transition process associated with blade feathering and rotor spin-up. The swashplate position increases as the feather angle decreases, and the rotor RPM rises to a maximum magnitude. However, the rotor thrust further decreases below zero (increasing the drag) and the rotor aerodynamic torque fluctuates downwardly to a minimal magnitude. Column 904 shows the metrics associated with thrust transfer to the rotor system. The swashplate position decreases as the feather angle increases, and the rotor RPM is effectively steady. However, the rotor thrust increases from drag for a period before settling out at a positive magnitude, and the rotor aerodynamic torque decreases to zero.

Figure 10:
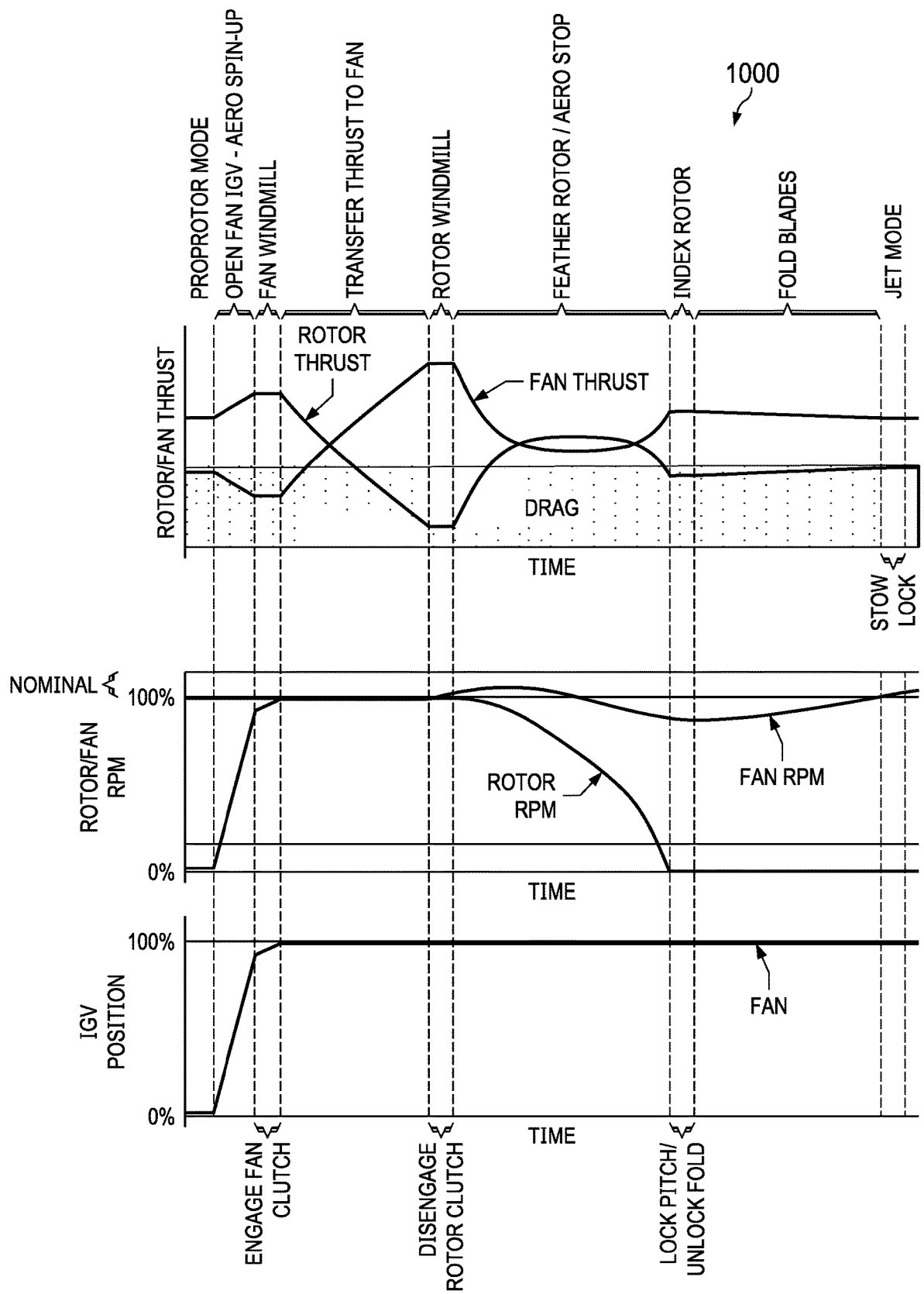
FIG. 10 is a schematic view of various rotor and fan thrust outbound transition timelines, in accordance with the present disclosure.

FIG. 10 is a schematic view of various rotor and fan thrust outbound transition timelines, in accordance with the present disclosure. The timeline shows the following graphics along a common timeline to disclose the temporal relationship between the rotor/fan thrust, rotor/fan RPM, and IGV position.

Figure 11:
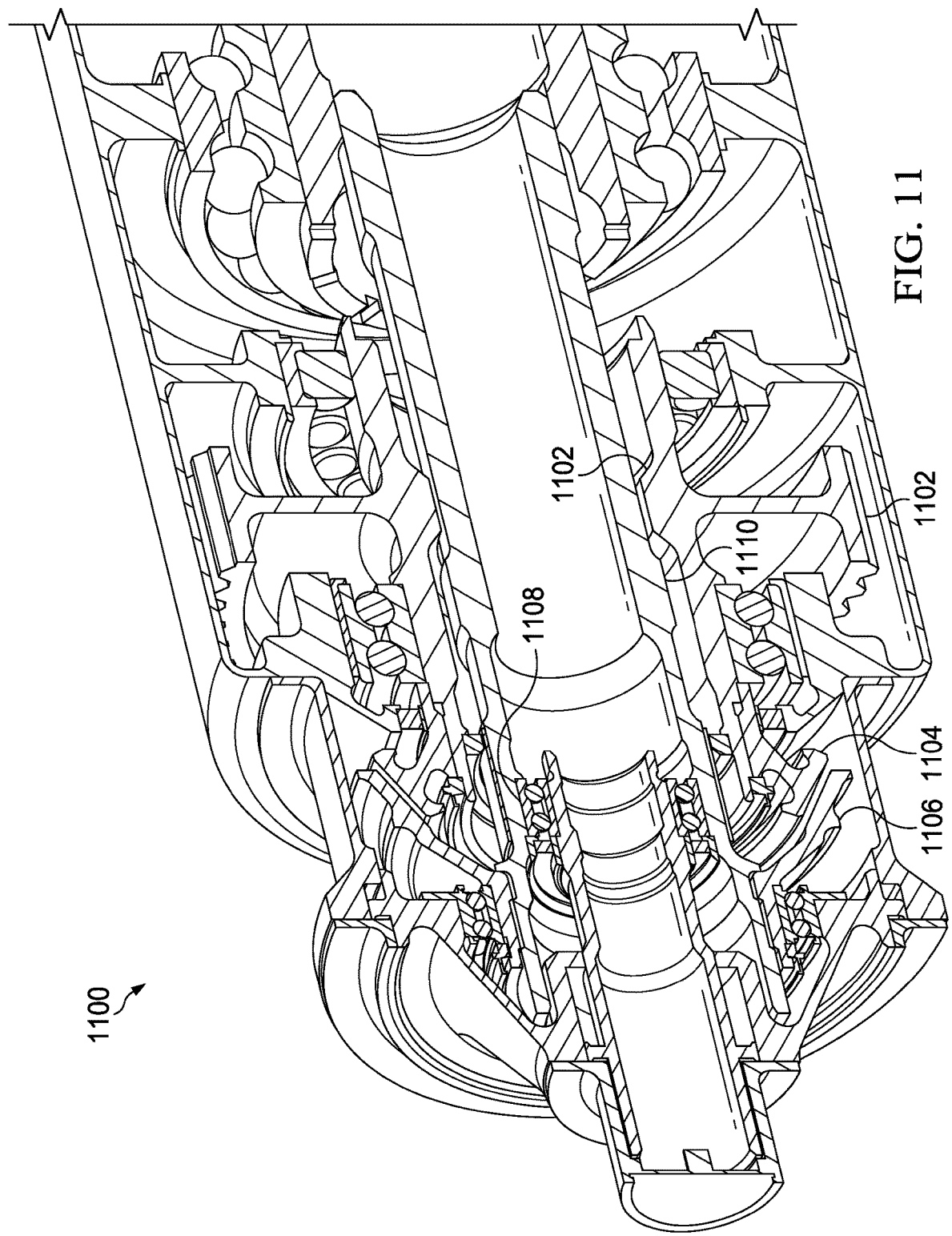
FIG. 11 is a cross-sectional view of a clutch assembly, in accordance with the present disclosure.

FIG. 11 is a cross-sectional view of a clutch assembly, in accordance with the present disclosure. The clutch 1100 can include a gear 1102, a synchronizer inner cone 1104, a synchronizer outer cone 1106, a lock shaft 1108, and a lock shaft spline 1110. The synchronizer inner cone 1104 and the synchronizer outer cone 1106 can form a friction clutch. The clutch assembly 1100 can form both the fan clutch and the rotor clutch.

During the outbound transition process, the IGV 119 will start in a closed position and gradually open to allow airflow through the thrust fan 116, causing the fan 116 to spin up aerodynamically. As the fan 116 spins up aerodynamically the thrust fan's 116 rotation speed is increased to substantially the same rotation speed of the engine cores 102. Once the thrust fan's 116 RPMs effectively match the engine cores' 102 RPMs, the fan clutch 114 can be engaged. Because the two components have a minimal rotation speed difference, a friction clutch can be utilized, as there is only a small amount of RPM to overcome. That small rotational speed difference allows the fan clutch to be sized for a small amount of torque, thereby greatly reducing the weight requirement typical in conventional systems. The fan clutch 114 brings the engine 102 and the fan 116 to the same speed and a spline shaft slides into position to transfer the entirety of the torque. The friction clutch of the fan clutch 114 is a heavy component, so the aircraft 100 propulsion system is designed so the thrust fan 116 and the engine core 102 engage and disengage at the minimum torque possible, essentially synchronizing the two speeds with some differential RPM. The fan clutch 114 is sized to be as small and as light as possible. This minimal clutch sizing is possible because, aerodynamically, the thrust fan 116 is spun up to speed to match the engine's 102 RPMs before the clutch is engaged. Once the fan clutch 114 is engaged the collective pitch on rotor system 104 are varied, the IGV 119 is further changed such that the power from the main rotor system 104 is transferred to the thrust fan 116 and the rotors are retracted into a stowed mode. Once the rotors are disengaged, their rotation is halted and the rotor blades are feathered and retracted.

During the inbound transition process, the transition process works in reverse of the outbound transition process. The thrust fan 116, creates the thrust for the aircraft while in airplane mode. The rotor blades are deployed and collectively pitched spin-up and produce thrust. The IGV 119 is slowly closed to decrease the airflow to the fan 116 and decreasing the power absorbed, but the thrust fan 116 is still spinning at the same speed because everything is connected mechanically. Both the fan clutch and corresponding high torque spline and the rotor clutch and corresponding high torque spline are engaged at the same time. Once the rotors 104 are producing all the thrust and the fan is still spinning at its nominal speed, the fan 116 can be de-clutched and the IGV 119 can be closed. The fan 116 stops spinning so all the power and all the torque is transferred to the rotor system 104, in proprotor mode. The aircraft 100 can then convert back into helicopter mode. The aircraft can land or hover.

Figure 12:
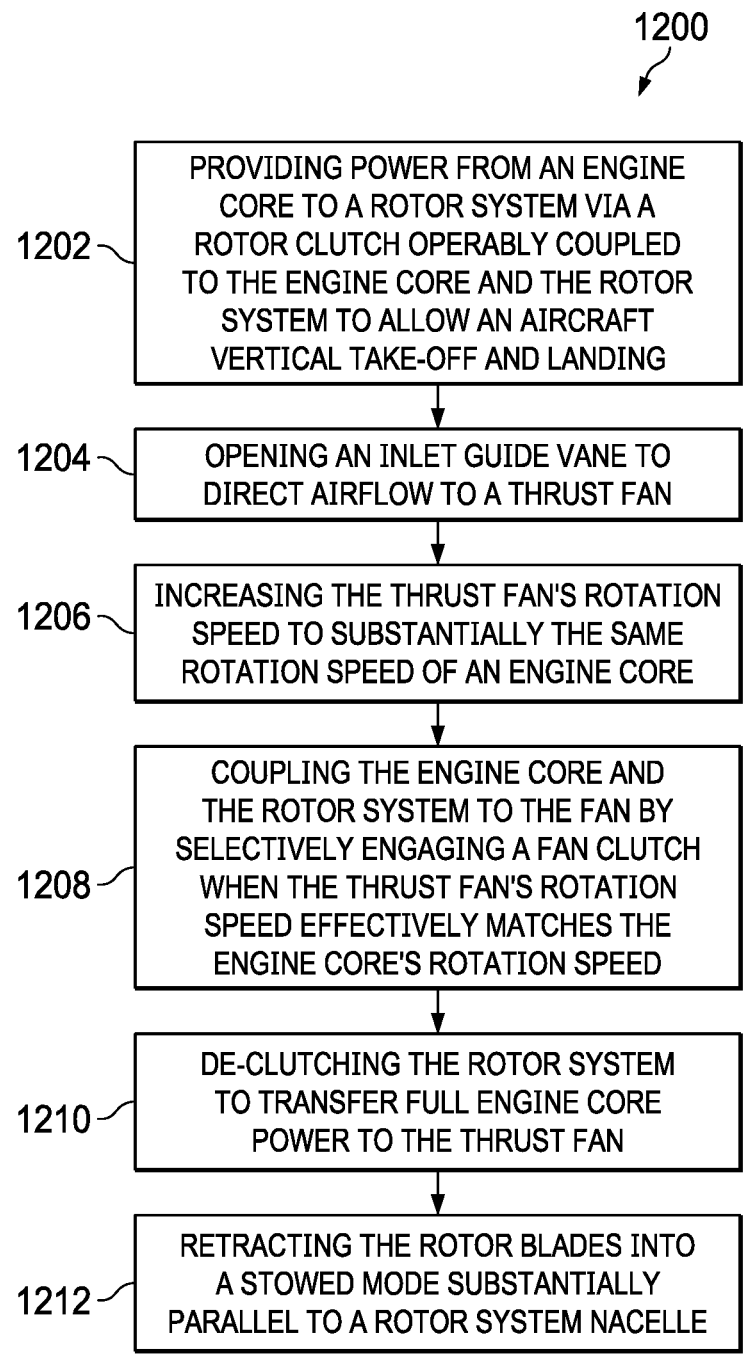
FIG. 12 is a block diagram of a method for transitioning an aircraft from propriotor mode to airplane mode, in accordance with the present disclosure.

FIG. 12 is a block diagram of a method 1200 for transitioning an aircraft from proprotor mode to airplane mode, in accordance with the present disclosure. The method 1200 begins at 1202 where an engine core provides power to a rotor system via a rotor clutch operably coupled to the engine core and the rotor system to allow an aircraft vertical take-off and landing. The method then proceeds to step 1204.

At step 1204, an inlet guide vane opens to direct airflow to a thrust fan. The method then proceeds to step 1206.

At step 1206, the thrust fan's rotation speed is increased to substantially the same rotation speed of an engine cores (at the clutch connect point. The actual fan and engine will be separated in speed by the gear ratio). The method then proceeds to step 1208.

At step 1208, the engine core and the rotor system are coupled to a fan by selectively engaging a fan clutch when the thrust fan's rotation speed effectively matches the engine core's rotation speed (at the clutch engage location). The method then proceeds to step 1210.

At step 1210, the rotor system can be de-clutched to transfer full engine core power to the thrust fan. The method then proceeds to step 1212.

At step 1212, the rotor blades can be retracted into a stowed mode, substantially parallel to a rotor system nacelle.

The inventions of the present disclosure achieve at least the following advantages:
 1. Provides SHP to rotors for VTOL flight, provides SHP to thrust fan for high speed, turbofan flight;
 2. Allows rotor and fan to be clutched on and off sequentially to enable transition from rotor-born VTOL flight to wing-born fan flight, and back. De-clutched fan:
    a. Generates no residual thrust, and
    b. Does not rob engine power available from rotors in VTOL mode;
 3. Outbound flight transition:
    a. Rotor powered turbo-prop mode, IGV open to aerodynamically spin up thrust fan,
    b. Clutch and spline lock engage fan, engine powers both fan and rotor,
    c. IGVs, VAN and rotor collective pitch adjusted to transfer thrust from rotor to fan,
    d. Rotor de-clutched at zero torque condition, and e. Rotor stopped, folded, for high-speed, turbofan powered flight;
4. Since fan and engine are separated, allows more engine options, independent of thrust fan; does not require a special engine type;
5. Separate inlet treatment of engine core flow, enables use of inlet barrier filter (IBF);
6. Thrust fan can utilize inlet guide vanes (IGVs) and variable area nozzle (VAN) to modulate thrust independent of engine rpm;
7. Engine and fan can operate at different, optimal rpms;
8. De-clutching thrust fan provides greater power to rotors in hover/VTOL mode and no residual thrust;
9. Centralized fan is easier to hide forward facing fan face with bi-furcated inlets;
10. Upward directed hot exhaust ducting is shielded/hidden from bottom/side view, preventing thermal detection; and
11. Thrust fan can be located to ideally shape inlets without adverse CG placement implications.

While the inventions have been shown in specific embodiments, they are not thus limited and are susceptible to various changes and modifications without departing from the spirit thereof. Persons skilled in the art will understand that these concepts are susceptible to various changes and modifications, and may be implemented or adapted readily to other types of environments. Further, the individual elements of the claims are not well-understood, routine, or conventional. Instead, the claims are directed to the unconventional inventive concepts described herein.

What is claimed is:

1. A tiltrotor aircraft, comprising: an engine core;
a thrust fan;
a rotor system;
an inlet guide vane configured to modulate airflow to the thrust fan; and
a combined gearbox operably coupled to the engine core and the thrust fan, the combined gearbox having a rotor clutch configured to selectively couple the rotor system to the engine core and a fan clutch configured to selectively couple the thrust fan to the engine core.

2. The aircraft of claim 1, wherein the fan clutch includes a friction clutch.

3. The aircraft of claim 1, wherein the rotor clutch includes a friction clutch.

4. The aircraft of claim 1, further comprising a variable area nozzle configured to modulate the thrust of the thrust fan.

5. The aircraft of claim 1, wherein the rotor clutch includes a lockshaft spline.

6. The aircraft of claim 1, wherein the fan clutch includes a lockshaft spline.

7. An aircraft comprising:
a combined gearbox, the combined gearbox comprising:
a rotor clutch coupled to an engine core and selectively coupled to a rotor system; and
a fan clutch coupled to an engine core and selectively coupled to a thrust fan having airflow modulated by an inlet guide vane.

8. The aircraft of claim 7, wherein the rotor clutch is engaged and the fan clutch is disengaged when the aircraft is in a helicopter mode.

9. The aircraft of claim 7, wherein the rotor clutch transfers the power from the engine core to the rotor systems by engaging a rotor drive shaft.

10. The aircraft of claim 7, wherein the fan clutch transfers the power from the engine core to the thrust fan by engaging a fan drive shaft.

11. The aircraft of claim 7, wherein the rotor clutch is disengaged and the fan clutch is engaged when the aircraft is in an airplane mode.

* * * * *